(12) United States Patent
Hirunuma et al.

(10) Patent No.: US 7,460,776 B2
(45) Date of Patent: Dec. 2, 2008

(54) STAGE APPARATUS AND CAMERA SHAKE CORRECTION APPARATUS USING THE STAGE APPARATUS

(75) Inventors: Ken Hirunuma, Tokyo (JP); Shigeo Enomoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 362 days.

(21) Appl. No.: 11/457,585

(22) Filed: Jul. 14, 2006

(65) Prior Publication Data
US 2007/0014555 A1    Jan. 18, 2007

(30) Foreign Application Priority Data
Jul. 15, 2005    (JP) .................. P2005-206414

(51) Int. Cl.
*G03B 17/00* (2006.01)
(52) U.S. Cl. .................. 396/55; 348/208.4; 348/208.7; 348/208.11; 359/554; 359/555; 359/556; 359/557; 359/816
(58) Field of Classification Search .................. 396/55; 348/208.4, 208.7, 208.11, 219.1; 359/554–557; 310/12; 33/1 M
See application file for complete search history.

(56) References Cited

U.S. PATENT DOCUMENTS

| | | | | |
|---|---|---|---|---|
| 5,748,995 A * | 5/1998 | Kitagawa et al. | ............. | 396/55 |
| 5,995,762 A | 11/1999 | Enomoto et al. | | |
| 6,038,013 A * | 3/2000 | Ohsaki | ............. | 355/53 |
| 6,718,131 B2 * | 4/2004 | Okazaki et al. | ............. | 396/55 |
| 6,909,560 B2 * | 6/2005 | Lin et al. | ............. | 359/813 |
| 7,327,952 B2 * | 2/2008 | Enomoto | ............. | 396/55 |
| 7,379,092 B2 * | 5/2008 | Seo | ............. | 348/208.4 |
| 2005/0052570 A1 | 3/2005 | Enomoto et al. | | |
| 2005/0157287 A1 | 7/2005 | Seo | | |
| 2005/0185057 A1 | 8/2005 | Seo | | |
| 2005/0204640 A1 | 9/2005 | Seo | | |
| 2006/0007320 A1 | 1/2006 | Seo | | |
| 2006/0017818 A1 | 1/2006 | Enomoto | | |
| 2006/0064884 A1 | 3/2006 | Seo | | |
| 2006/0070302 A1 | 4/2006 | Seo | | |
| 2006/0146400 A1 | 7/2006 | Seo | | |

FOREIGN PATENT DOCUMENTS

JP    2001-215543    8/2001

OTHER PUBLICATIONS

English language Abstract of JP 2001-215543.
U.S. Appl. No. 11/423,593 to Seo et al., filed Jun. 12, 2006.

* cited by examiner

*Primary Examiner*—W. B. Perkey
*Assistant Examiner*—Linda B Smith
(74) *Attorney, Agent, or Firm*—Greenblum & Bernstein, P.L.C.

(57) ABSTRACT

A stage apparatus includes a stationary support member, a movable stage plate supported by the stationary support member to be movable in a plane relative to the stationary support member, at least one magnetic force generator which is provided integral with the stationary support member, and at least one coil which is mounted on the movable stage plate and receives a magnetic force generated by the magnetic force generator to produce a driving force for driving the movable stage plate in the plane. At least one hole in which the coil is fixedly fitted is formed on the movable stage plate.

19 Claims, 10 Drawing Sheets

STAGE APPARATUS AND CAMERA SHAKE CORRECTION APPARATUS USING THE STAGE APPARATUS

BACKGROUND OF THE INVENTION

1. Field of the Invention

The present invention relates to a stage apparatus for substantially linearly moving a structural component, that supports an element, e.g., an image pickup device or the like, in two orthogonal directions in a plane, and a camera shake correction apparatus using such a stage apparatus.

2. Description of the Prior Art

A known stage apparatus used as a camera shake correction apparatus in which a movable stage plate is substantially linearly moved in two orthogonal directions in a plane is described in, for example, Japanese laid-open patent publication No. 2001-215543.

Such a known stage apparatus (shake correction apparatus) provided in a digital camera is provided with a stationary support member, a movable stage plate, an image pickup device, a magnetic force generator, an X-axis direction drive coil and a Y-axis direction drive coil. The stationary support member is fixed to a camera body. The movable stage plate is supported by the stationary support member to be movable relative to the stationary support member in a plane orthogonal to an optical axis of the camera. The image pickup device is fixed to a front surface of the movable stage plate. The magnetic force generator is integral with the stationary support member. The X-axis direction drive coil and the Y-axis direction drive coil are mounted on the movable stage plate and produce a driving force in the specific X-axis direction and a driving force in the Y-axis direction perpendicular to the X-axis direction by receiving magnetic forces generated by the magnetic force generator.

Upon the occurrence of camera shake, a current flows through each of the X-axis direction drive coil and the Y-axis direction drive coil, which causes the movable stage plate to move in the X-axis and Y-axis directions to counteract (correct) image shake due to vibrations such as hand shake.

In the Japanese laid-open patent publication No. 2001-215543, since both the X-axis direction drive coil and the Y-axis direction drive coil are fixed to the front face of the movable stage plate, the total thickness of any one of the drive coils and a portion of the movable stage plate to which the drive coils are fixed in the forward/rearward direction is large.

In the case where the length of the driven element (e.g., a lens element or an image pickup device which is driven to counteract image shake) in the optical axis direction is relatively large, the aforementioned total thickness is negligible. However, due to advancements in the reduction in thickness of cameras in recent years, such a total thickness has become a considerable problem.

Moreover, in the case where an image pickup device is driven to counteract image shake, this total thickness becomes more considerable because the image pickup device is thinner in an optical axis direction than an optical lens element and generally flatter.

SUMMARY OF THE INVENTION

The present invention provides a stage apparatus which is structured so that the total thickness of any one of the drive coils and a portion of the movable stage plate to which the drive coils are fixed can be made smaller than the prior art, and also provides a camera shake correction apparatus using such a stage apparatus.

According to an aspect of the present invention, a stage apparatus is provided, including a stationary support member; a movable stage plate supported by the stationary support member to be movable in a plane relative to the stationary support member; at least one magnetic force generator which is provided integral with the stationary support member; and at least one coil which is mounted on the movable stage plate and receives a magnetic force generated by the magnetic force generator to produce a driving force for driving the movable stage plate in the plane. At least one hole in which the coil is fixedly fitted is formed on the movable stage plate.

It is desirable for the hole to be a through-hole.

It is desirable for thickness of the coil to be smaller than a depth of the hole so that the coil is positioned within the hole.

It is desirable for two coils to respectively include an X-axis direction drive coil for generating a driving force in a specific X-axis direction in the plane, and a Y-axis direction drive coil for generating a driving force in a Y-axis direction, which is perpendicular to the X-axis direction, in the plane, and for two holes to respectively include an X-direction-coil hole in which the X-axis direction drive coil is fixedly fitted, and a Y-direction-coil hole in which the Y-axis direction drive coil is fixedly fitted.

It is desirable for the stage apparatus to include a Y-axis direction deformable body including a stationary support member, a movable support member and a pair of X-axis direction leaf springs to form a substantially rectangular shape in a free state; and an X-axis direction deformable body, positioned in the Y-axis direction deformable body, including a connecting member, a support member and a pair of Y-axis direction leaf springs to form a substantially rectangular shape in a free state. The stationary support member and the movable support member of the Y-axis direction deformable body and the pair of Y-axis direction leaf springs of the X-axis direction deformable body extend in the Y-axis direction. The pair of X-axis direction leaf springs of the Y-axis direction deformable body and the connecting member and the support member of the X-axis direction deformable body extend in the X-axis direction. The support member of the X-axis direction deformable body includes a support member joint portion which joins the support member to the movable support member of the Y-axis direction deformable body.

It is desirable for the magnetic force generator to include at least one yoke which is made of a magnetic material and provided integral with the stationary support member; and at least one magnet for producing magnetic lines of force between the magnet and the yoke.

It is desirable for at least one sensor hole to be formed on the movable stage plate, a position sensor being fixedly fitted in the sensor hole.

It is desirable for the position sensor to be a Hall element that detects variations in magnetic flux generated by the magnetic force generator.

It is desirable for a thickness of the position sensor to be smaller than a depth of the sensor hole so that the position sensor is accommodated within the sensor hole.

It is desirable for two position sensors to respectively include an X-axis direction position sensor for detecting a position of the movable stage plate in a specific X-axis direction in the plane, and a Y-axis direction position sensor for detecting a position of the movable stage plate in a Y-axis direction, which is perpendicular to the X-axis direction, in the plane, and for two sensor holes to respectively include a x-direction-sensor hole in which the X-axis direction position sensor is fixedly fitted, and a Y-direction-sensor hole in which the Y-axis direction position sensor is fixedly fitted.

It is desirable for the coil to be formed as a flat coil lying in the plane.

It is desirable for the coil to be substantially rectangularly coiled.

It is desirable for the coil to be substantially identical to the hole with respect to outer shape and size thereof so as to be snugly fitted therein.

It is desirable for the movable stage plate to include at least one projection which substantially lies in the plane, the hole being formed on the projection.

It is desirable for the hole and the sensor hole to be communicatively connected to each other.

It is desirable for the stage apparatus to be incorporated in a camera.

It is desirable for an image pickup device to be mounted on the movable stage plate.

In an embodiment, a camera shake correction apparatus is provided, having a stage apparatus including a stationary support member; a movable stage plate supported by the stationary support member to be movable in a plane relative to the stationary support member; an X-axis direction magnetic force generator and a Y-axis direction magnetic force generator which are provided integral with the stationary support member; an X-axis direction drive coil for generating a driving force in a specific X-axis direction in the plane and receives a magnetic force generated by the X-axis direction magnetic force generator to produce a driving force for driving the movable stage plate in the X-axis direction in the plane; a Y-axis direction drive coil for generating a driving force in a Y-axis direction, which is perpendicular to the X-axis direction, in the plane and receives a magnetic force generated by the Y-axis direction magnetic force generator to produce a driving force for driving the movable stage plate in the Y-axis direction in the plane; an X-direction-coil hole in which the X-axis direction drive coil is fixedly fitted; a Y-direction-coil hole in which the Y-axis direction drive coil is fixedly fitted; an X-direction-sensor hole formed on the movable stage plate having an X-axis direction position sensor fixedly fitted therein for detecting a position of the movable stage plate in the X-axis direction in the plane; a Y-direction-sensor hole formed on the movable stage plate having a Y-axis direction position sensor fixedly fitted therein for detecting a position of the movable stage plate in and Y-axis direction in the plane. The camera shake correction apparatus include a camera which incorporates the stage apparatus; an image pickup device positioned behind a photographing optical system of the camera, having an imaging surface located on an image plane of the photographing optical system, the image pick device being movable together with the movable stage plate; a camera shake detection sensor which detects camera shake of the camera; and a controller which applies a voltage to at least one of the X-axis direction drive coil and the Y-axis direction drive coil to reduce a difference between the amount of the camera shake detected by the camera shake detection sensor and the amount of movement of the movable stage plate which is detected using the X-axis direction position sensor and the Y-axis direction position sensor.

In an embodiment, a camera shake correction apparatus is provided, having a stage apparatus including a stationary support member; a movable stage plate supported by the stationary support member to be movable in a plane relative to the stationary support member; an X-axis direction magnetic force generator and a Y-axis direction magnetic force generator which are provided integral with the stationary support member; an X-axis direction drive coil for generating a driving force in a specific X-axis direction in the plane and receives a magnetic force generated by the X-axis direction magnetic force generator to produce a driving force for driving the movable stage plate in the X-axis direction in the plane; a Y-axis direction drive coil for generating a driving force in a Y-axis direction, which is perpendicular to the X-axis direction, in the plane and receives a magnetic force generated by the Y-axis direction magnetic force generator to produce a driving force for driving the movable stage plate in the Y-axis direction in the plane; an X-direction-coil hole in which the X-axis direction drive coil is fixedly fitted; a Y-direction-coil hole in which the Y-axis direction drive coil is fixedly fitted; an X-direction-sensor hole formed on the movable stage plate having an X-axis direction position sensor fixedly fitted therein for detecting a position of the movable stage plate in the X-axis direction in the plane; a Y-direction-sensor hole formed on the movable stage plate having a Y-axis direction position sensor fixedly fitted therein for detecting a position of the movable stage plate in and Y-axis direction in the plane. The camera shake correction apparatus includes a camera which incorporates the stage apparatus; a correction lens located in front of an image plane of a photographing optical system of the camera, positioned so that an optical axis of the correction lens coincides with an optical axis of the photographing optical system, and being movable together with the movable stage plate; a camera shake detection sensor which detects camera shake of the camera; and a controller which applies a voltage to at least one of the X-axis direction drive coil and the Y-axis direction drive coil to reduce a difference between the amount of the camera shake detected by the camera shake detection sensor and the amount of movement of the movable stage plate which is detected using the X-axis direction position sensor and the Y-axis direction position sensor.

According to the present invention, the thickness of a portion of the stage apparatus in the optical axis direction at which the coil overlies the movable stage plate becomes smaller than that of a conventional stage apparatus because the coil is fixedly fitted into the recess formed on the movable stage plate. Accordingly, the stage apparatus and the camera shake correction apparatus using the stage apparatus can be miniaturized in the forward/rearward direction. Moreover, even if the magnetic force generator is miniaturized and make thinner, the movable stage plate can be made to operate in the same manner as in the prior art since it is easier for the magnetic force generated by the magnetic force generator to act on the coil than before.

The present disclosure relates to subject matter contained in Japanese Patent Application No. 2005-206414 (filed on Jul. 15, 2005) which is expressly incorporated herein in its entirety.

BRIEF DESCRIPTION OF THE DRAWINGS

The present invention will be discussed below in detail with reference to the accompanying drawings, in which:

FIG. 5 is a front elevational view of the camera shake correction apparatus;

FIG. 6 is a cross sectional view taken along VI-VI line shown in FIG. 5;

DESCRIPTION OF THE PREFERRED EMBODIMENTS

An embodiment of a camera shake correction apparatus (image stabilizer) according to the present invention will be hereinafter discussed with reference to the attached drawings.

Figure 1:
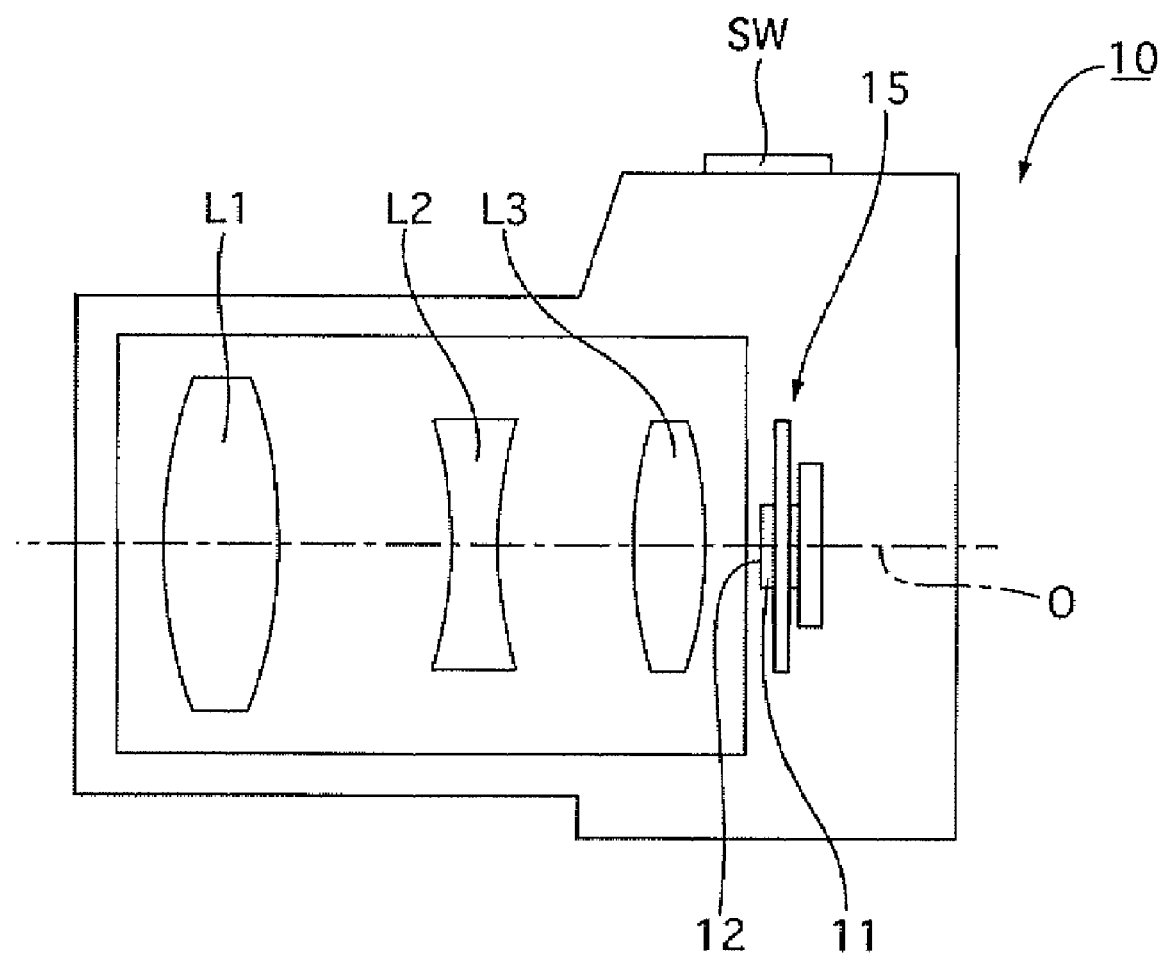
FIG. 1 is a longitudinal sectional view of a digital camera which incorporates an embodiment of a camera shake correction apparatus using a stage apparatus according to the present invention.

The camera shake correction apparatus 15 is incorporated in a digital camera 10 (in a camera body thereof) as shown in FIG. 1. As shown in FIG. 1, the digital camera 10 is provided therein with a photographing optical system including a plurality of lenses L1, L2 and L3. An image pickup device (e.g., CCD or CMOS image sensor) 11 is provided behind the lens L3. The image pickup device 11 is provided with an imaging surface (image-forming plane) 12 which is located on an image plane of the photographing optical system and is perpendicular to an optical axis O of the photographing optical system. The image pickup device 11 is secured to the camera shake correction apparatus (stage apparatus) 15 that is incorporated in the digital camera 10.

The camera shake correction apparatus 15 that is fixed to the camera body of the digital camera 10 at a position immediately behind the lenses L1, L2 and L3 is constructed as described in the following description.

Figure 3:
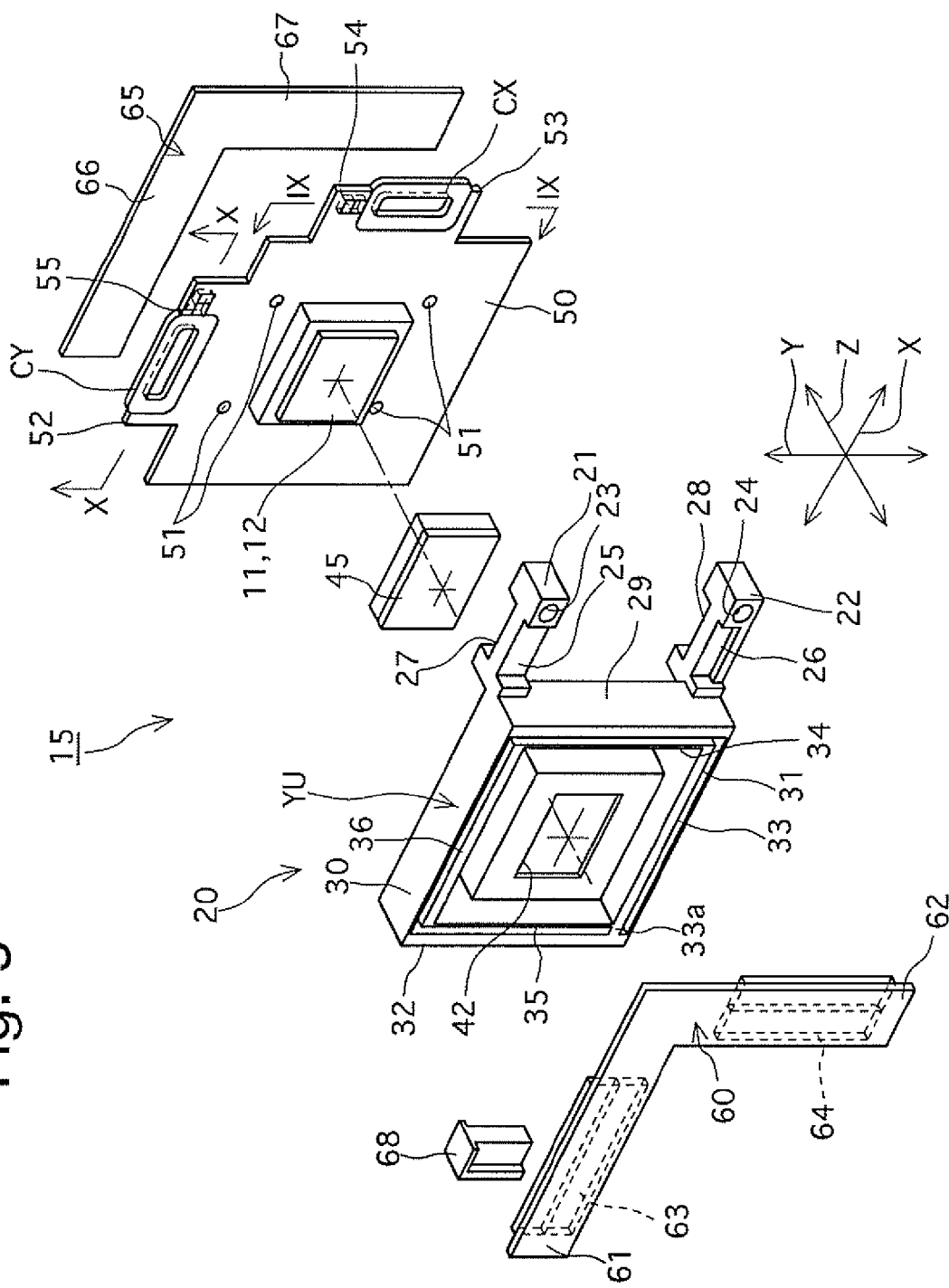
FIG. 3 is an exploded perspective view of the camera shake correction apparatus.

The camera shake correction apparatus 15 is provided with a rectangular mounting frame 20 which is fixed to the camera body. The rectangular mounting frame 20 is provided with a pair of spacers (upper and lower spacers) 21 and 22 which extend rightward as viewed in FIG. 5 along an X-axis direction (horizontal direction of the digital camera 10; the arrow X shown in FIG. 3). The rectangular mounting frame 20 is fixed to the camera body by two set screws (not shown) which extend through upper and lower fixing holes 23 and 24 formed through the ends of the pair of spacers 21 and 22, respectively. The pair of spacers 21 and 22 are provided on front surfaces thereof with a pair of front mounting recesses 25 and 26, respectively, and are further provided on rear surfaces of the pair of spacers 21 and 22 with a pair of rear mounting recesses 27 and 28, the shapes of which correspond to the pair of front mounting recesses 25 and 26, respectively. The rectangular mounting frame 20 is provided with a stationary support side-member (stationary support member) 29 which is elongated in a Y-axis direction (vertical direction of the digital camera 10; the arrow Y shown in FIG. 3), and the pair of spacers 21 and 22 are joined to the stationary support side-member 29 to be formed integral therewith. The rectangular mounting frame 20 is provided with a pair of X-axis direction leaf springs (upper and lower resilient leaves) 30 and 31 which are made of steel and are elongated leftward as viewed in FIG. 3 along the X-axis direction from upper and lower ends of the stationary support side-member 29. The rectangular mounting frame 20 is provided with a movable support side-member 32 which is elongated in the Y-axis direction, and left ends (as viewed in FIG. 5) of the pair of X-axis direction leaf springs 30 and 31 are connected to each other by the movable support side-member 32. The stationary support side-member 29 and the movable support side-member 32 are not resiliently deformable, whereas each of the pair of X-axis direction leaf springs 30 and 31 is resiliently deformable in the Y-axis direction.

The stationary support side-member 29, the pair of X-axis direction leaf springs 30 and 31 and the movable support side-member 32 constitute a Y-axis direction deformable body YU.

Figure 2:
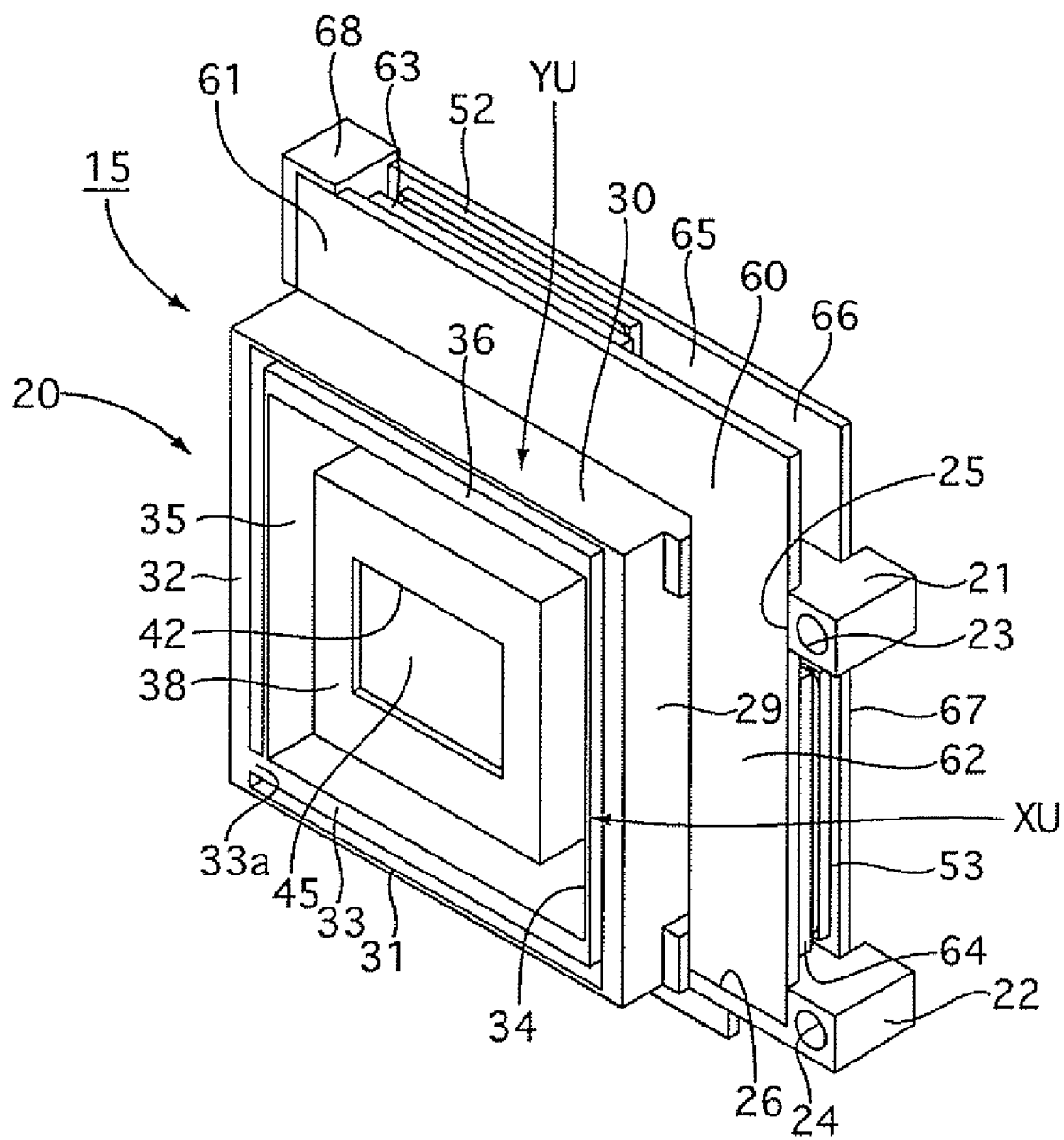
FIG. 2 is a perspective view of the camera shake correction apparatus.
Figures 5, 6:
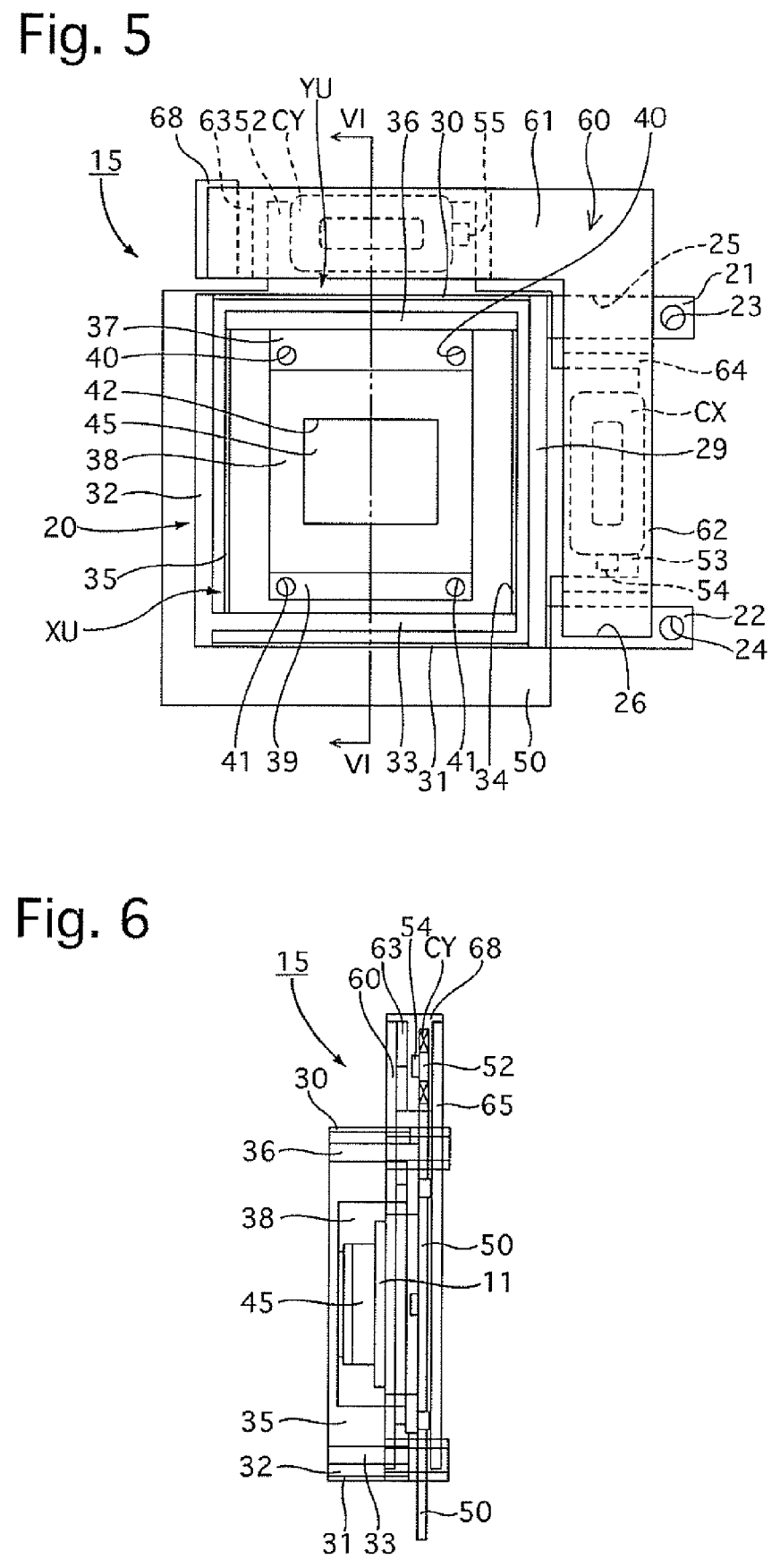

The rectangular mounting frame 20 is provided inside the Y-axis direction deformable body YU with a support member (horizontal support plate) 33 which is elongated rightward as viewed in FIG. 5 along the X-axis direction from an inner side surface of the movable support side-member 32 in the vicinity of the lower end thereof. Accordingly, the support member 33 is formed like a cantilever which extends from the movable support side-member 32. The supported end (left end as viewed in FIG. 2) of the support member 33 serves as a joint portion (support member joint portion) 33a which joins the support member 33 to the movable support side-member 32, and a pair of steel Y-axis direction leaf springs (right and left resilient leaves) 34 and 35 are elongated upward in the Y-axis direction from opposite ends of an upper surface of the support member 33 except the joint portion 33a, respectively. Upper ends of the pair of Y-axis direction leaf springs 34 and 35 are connected to each other by a connecting member (horizontal connecting plate) 36 which is elongated in the X-axis direction. The support member 33 and the connecting member 36 are not resiliently deformable, whereas each of the pair of Y-axis direction leaf springs 34 and 35 is resiliently deformable in the X-axis direction.

The support member 33, the pair of Y-axis direction leaf springs 34 and 35 and the connecting member 36 constitute an X-axis direction deformable body XU.

As shown in FIG. 5, the X-axis direction deformable body XU is provided on an inner surface of the connecting member 36 with an upper mounting portion 37 which extends downward from the connecting member 36 in the Y-axis direction to be positioned inside of the X-axis direction deformable body XU. The X-axis direction deformable body XU is further provided at a lower end of the upper mounting portion 37 with an support enclosure 38 which extends downward from the upper mounting portion 37 in the Y-axis direction. The support enclosure 38 has a substantially square shape as viewed from the front of the rectangular mounting frame 20. A lower mounting portion 39 is fixed to the bottom end of the support enclosure 38. The upper mounting portion 37 and the lower mounting portion 39 lie in a plane parallel to both the X-axis direction and the Y-axis direction, i.e., parallel to an X-Y plane. The upper mounting portion 37 is provided with two fixing holes (through-holes) 40, and the lower mounting portion 39 is provided with two fixing holes (through-holes) 41. The support enclosure 38 is formed in the shape of a box, the rear end of which is fully open. The support enclosure 38 is provided, on a front wall thereof at the center of the front wall, with a rectangular aperture 42.

The pair of spacers 21 and 22 and the stationary support side-member 29 are integrally molded from synthetic resin such as an ABS resin or a polycarbonate resin. The movable support side-member 32 and the support member 33 are integrally molded from the same synthetic material as the spacer 21. Additionally, the connecting member 36, the upper mounting portion 37, the support enclosure 38 and the lower mounting portion 39 are integrally molded from the same synthetic material as the spacer 21.

The camera shake correction apparatus 15 is provided in the support enclosure 38 with an optical low-pass filter 45 having a rectangular shape as viewed from the front of the camera shake correction apparatus 15. The optical low-pass filter 45 is fitted into the support enclosure 38 so that the front surface of the optical low-pass filter 45 faces the rectangular aperture 42. The image pickup device 11 is fitted into the support enclosure 38. The camera shake correction apparatus 15 is provided immediately behind the support enclosure 38 with a coil substrate (movable stage plate) 50 which is positioned parallel to the X-Y plane. The image pickup device 11 is fixed to a central portion of the front surface of the coil substrate 50. The coil substrate 50 and the rectangular mounting frame 20 are fixed to each other to become integral by four set screws (not shown) which are screwed into four female screw holes 51 in the coil substrate 50 through the four fixing holes 40 and 41 of the rectangular mounting frame 20, respectively.

Figure 4:
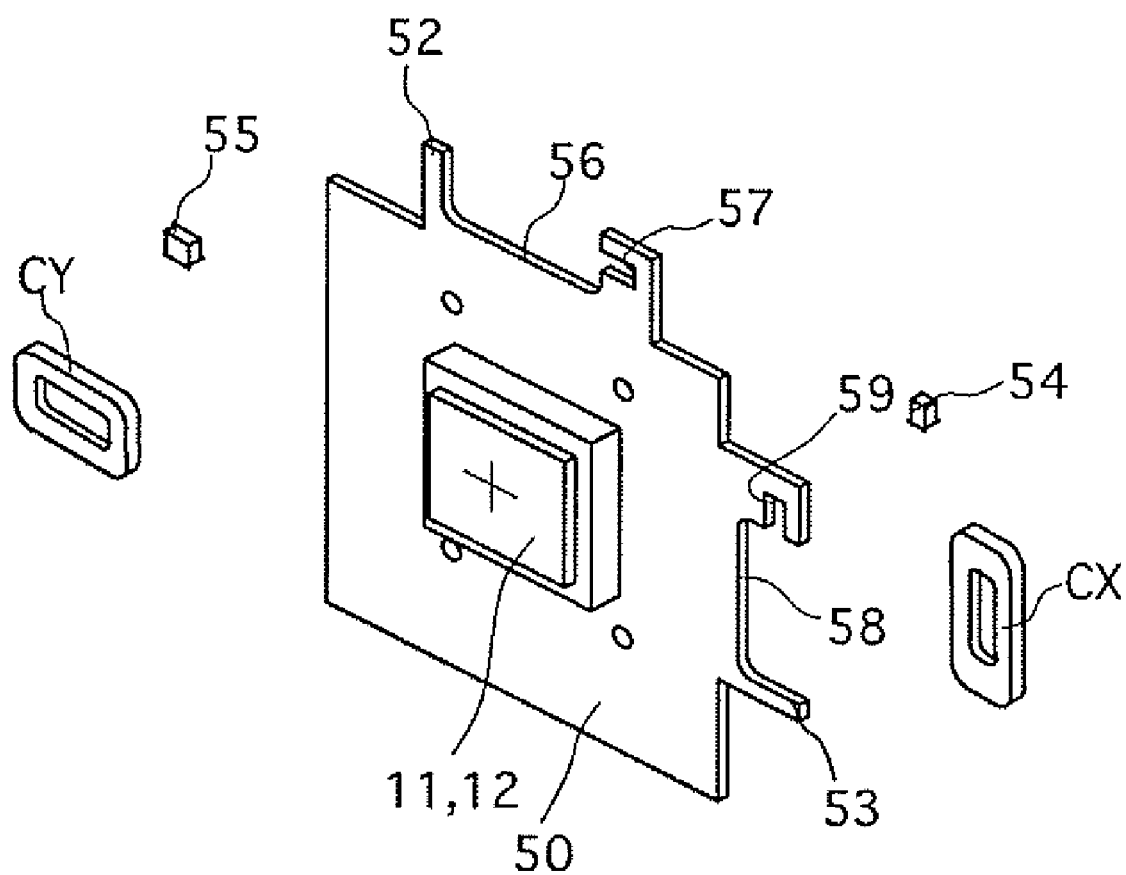
FIG. 4 is an exploded perspective view of a portion of the camera shake correction apparatus shown in FIG. 3 which includes a coil substrate, an X-axis direction planar drive coil, a Y-axis direction planar drive coil, an X-axis direction Hall element and a Y-axis direction Hall element.
Figure 7:
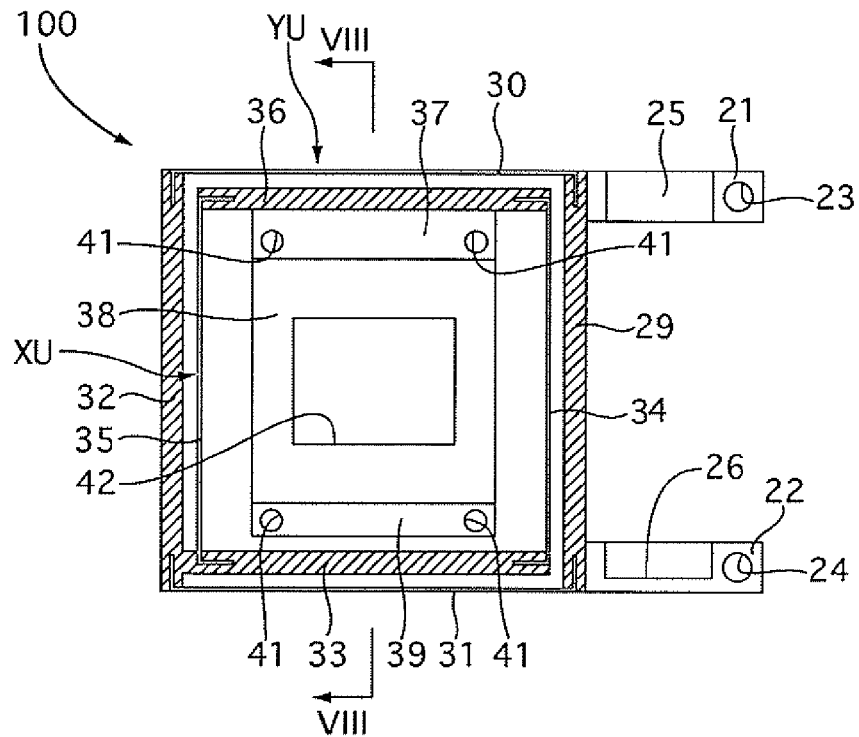
FIG. 7 is a traverse sectional view of a stage apparatus incorporated in the camera shake correction apparatus.
Figure 8:
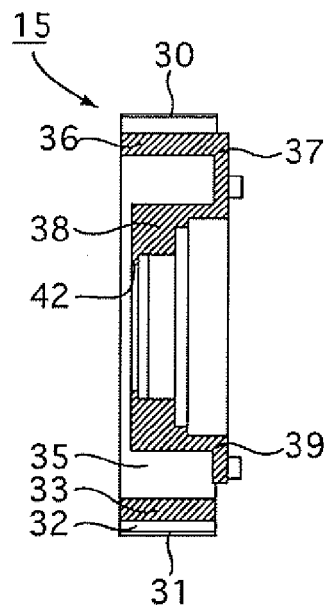
FIG. 8 is a cross sectional view taken along VIII-VIII line shown in FIG. 7.

An upper projection 52 and a right projection 53 project from an upper end and a right end of the coil substrate 50, respectively, and extend on a plane parallel to the X-Y plane. As shown in FIG. 4, the upper projection 52 is provided with a Y-direction-coil cutout portion (Y-direction-coil hole) 56 which has a horizontal rectangular shape, and an Y-direction-sensor cutout portion (Y-direction-sensor hole) 57 which is similar in shape but smaller in size compared to the Y-direction-coil cutout portion 56. Similarly, the right projection 53 is provided with an X-direction-coil cutout portion (X-direction-coil hole) 58 which has a vertical rectangular shape, and an X-direction-sensor cutout portion (X-direction-sensor hole) 59 which is similar in shape but smaller in size compared to the X-direction-coil cutout portion 58. The X-direction-sensor cutout portion 59 has the same shape and size as the Y-direction-sensor cutout portion 57. The Y-direction-coil cutout portion 56 and the Y-direction-sensor cutout portion 57 are communicatively connected to each other, and the X-direction-coil cutout portion 58 and the x-direction-sensor cutout portion 59 are communicatively connected to each other.

The camera shake correction apparatus 15 is provided in the X-direction-sensor cutout portion 59 with an X-axis direction Hall element (X-axis direction position sensor) 54 which is substantially identical in shape and size in front view to the X-direction-sensor cutout portion 59 and is smaller in thickness than the X-direction-sensor cutout portion 59. The X-axis direction Hall element 54 is fixedly fitted in the X-direction-sensor cutout portion 59. Similarly, the camera shake correction apparatus 15 is provided in the Y-direction-sensor cutout portion 57 with a Y-axis direction Hall element (Y-axis direction position sensor) 55 which is substantially identical in shape and size in front view to the Y-direction-sensor cutout portion 57 and is smaller in thickness than the Y-direction-sensor cutout portion 57. The Y-axis direction Hall element 55 is fixedly fitted in the Y-direction-sensor cutout portion 57.

Figure 9:
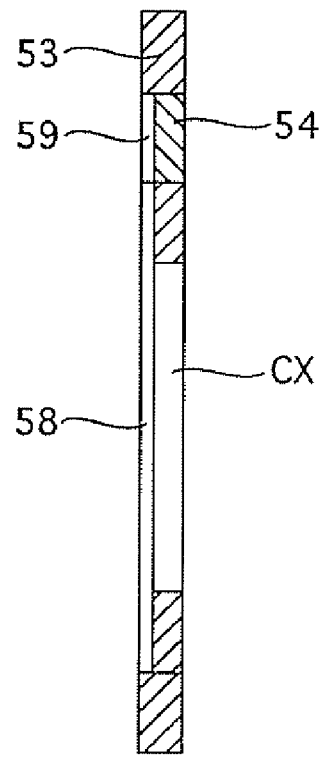
FIG. 9 is a cross sectional view of one of the two projecting portions of the coil substrate.
Figure 10:
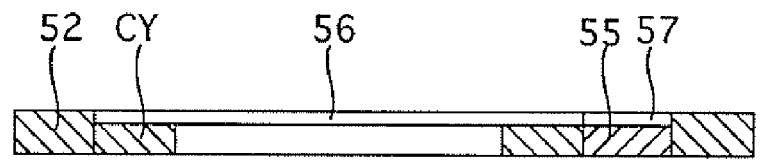
FIG. 10 is a cross sectional view of the other of the two projecting portions of the coil substrate.

As shown in FIGS. 9 and 10, the X-axis direction Hall element 54 is snugly fitted in the X-direction-sensor cutout portion 59 so that front and rear ends of the X-axis direction Hall element 54 do not project forward or rearward from the front and rear ends of the X-direction-sensor cutout portion 59, respectively, and the Y-axis direction Hall element 55 is snugly fitted in the Y-direction-sensor cutout portion 57 so that front and rear ends of the Y-axis direction Hall element 55 do not project forward or rearward from the front and rear ends of the Y-direction-sensor cutout portion 57, respectively.

The camera shake correction apparatus 15 is provided in the X-direction-coil cutout portion 58 with an X-axis direction planar drive coil CX which has over one hundred turns of wire (coiled both in directions parallel to the coil substrate 50 and in directions of the thickness of the coil substrate 50). The camera shake correction apparatus 15 is provided in the Y-direction-coil cutout portion 56 with a Y-axis direction planar drive coil CY which has over one-hundred turns of wire (coiled both in directions parallel to the coil substrate 50 and in directions of the thickness of the coil substrate 50). The X-axis direction planar drive coil CX and the Y-axis direction planar drive coil CY lie in a plane parallel to both the X-axis direction and the Y-axis direction, i.e., parallel to an X-Y plane, and are fitted in the X-direction-coil cutout portion 58 and the Y-direction-coil cutout portion 56, respectively, to be fixed thereto. The X-axis direction planar drive coil CX is substantially identical in outer-shape and size in front view to the X-direction-coil cutout portion 58 and is smaller in thickness (forward/rearward direction) than the X-direction-coil cutout portion 58, and the Y-axis direction planar drive coil CY is substantially identical in outer-shape and size in front view to the Y-direction-coil cutout portion 56 and is smaller in thickness (forward/rearward direction) than the Y-direction-coil cutout portion 56.

As shown in FIGS. 9 and 10, the X-axis direction planar drive coil CX is snugly fitted in the X-direction-coil cutout portion 58 so that front and rear ends of the X-axis direction planar drive coil CX do not project forward or rearward from the front and the rear of the X-direction-coil cutout portion 58, respectively, the Y-axis direction planar drive coil CY is snugly fitted in the Y-direction-coil cutout portion 56 so that front and rear ends of the Y-axis direction planar drive coil CY do not project forward or rearward from the front and the rear of the Y-direction-coil cutout portion 56, respectively.

Figure 11:
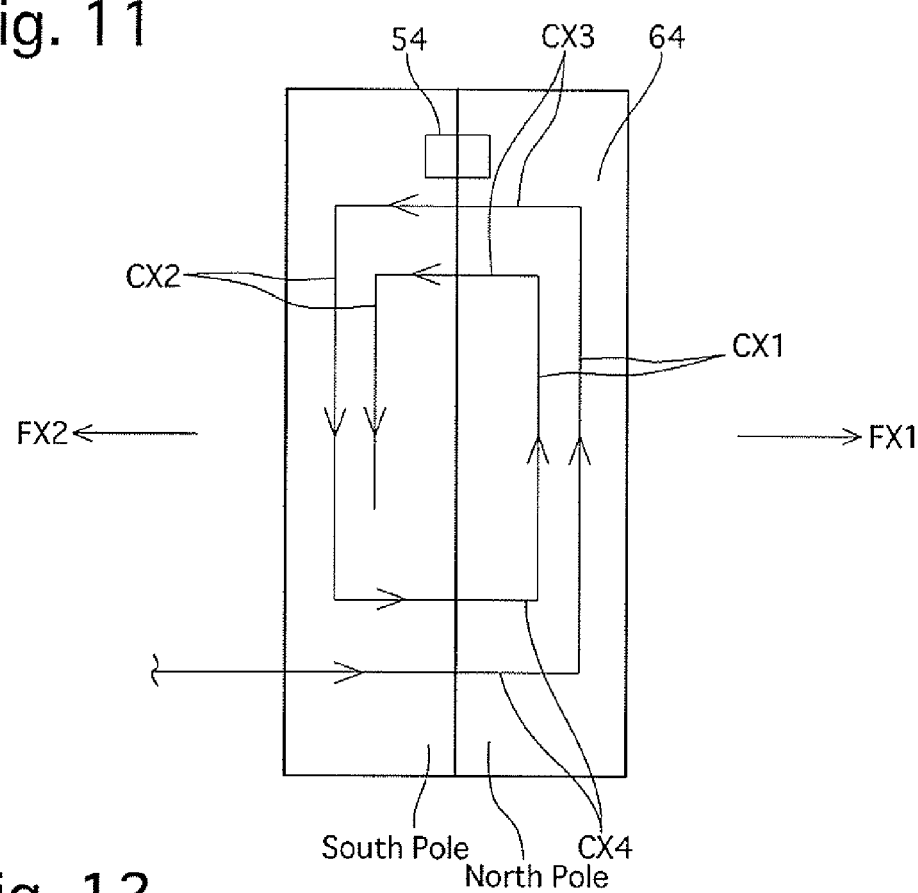
FIG. 11 is a schematic diagram of the X-axis direction planar drive coil and an X-axis direction magnet MX, showing the positional relationship therebetween.
Figure 12:
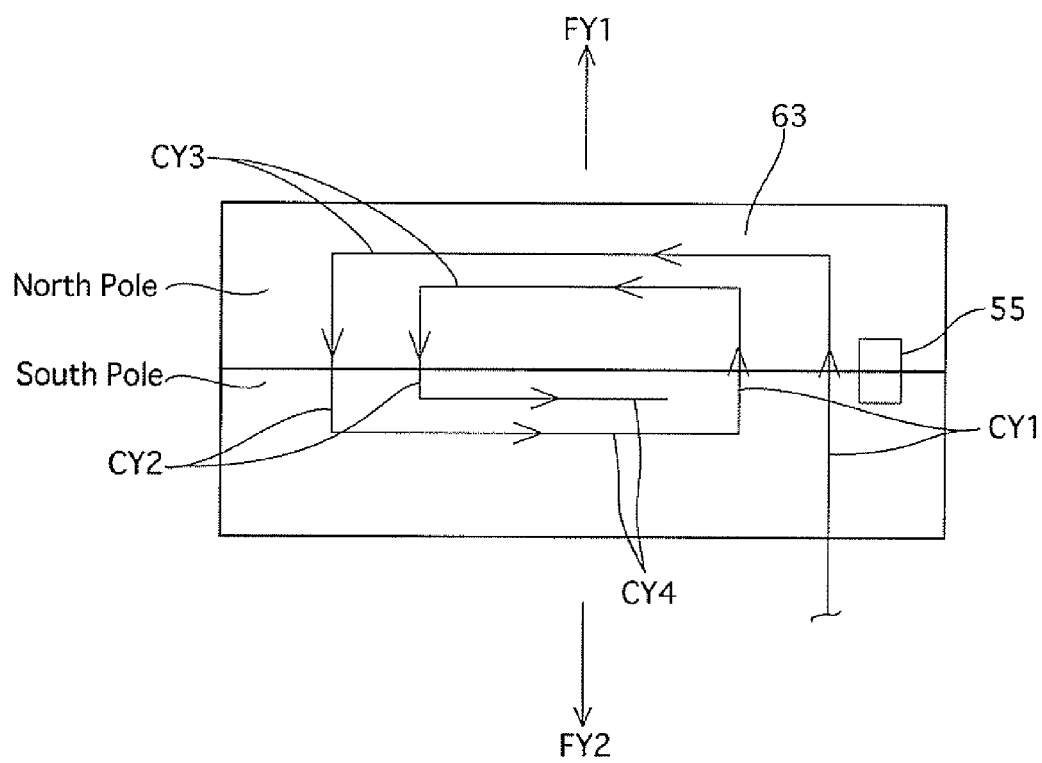
FIG. 12 is a schematic diagram of the Y-axis direction planar drive coil and a Y-axis direction magnet MY, showing the positional relationship therebetween.

FIGS. 11 and 12 schematically show the planar shapes of the X-axis direction planar drive coil CX and the Y-axis direction planar drive coil CY, respectively. As shown in FIG. 11, the X-axis direction planar drive coil CX is substantially rectangularly coiled and is defined by linear right sides CX1, linear left sides CX2, linear upper sides CX3 and linear lower sides CX4. As shown in FIG. 12, the Y-axis direction planar drive coil CY is substantially rectangularly coiled and is defined by linear right sides CY1, linear left sides CY2, linear upper sides CY3 and linear lower sides CY4. In addition, the X-axis direction planar drive coil CX that is fitted in the X-direction-coil cutout portion 58 to be fixed thereto prevents the X-axis direction Hall element 54 from coming out of the X-direction-sensor cutout portion 59, and the Y-axis direction planar drive coil CY that is fitted in the Y-direction-coil cutout portion 56 to be fixed thereto prevents the Y-axis direction Hall element 55 from coming out of the Y-direction-sensor cutout portion 57.

The camera shake correction apparatus 15 is provided with two yoke members: a planar L-shaped front yoke 60 and a planar L-shaped rear yoke 65 positioned behind the front yoke 60. These two yoke members are made of a soft magnetic material such as iron, have the same shape and size, and are parallel to an X-Y plane. The front yoke 60 is provided with a Y-axis direction plate portion 62, upper and lower portions of which are fitted in the pair of front mounting recesses 25 and 26 of the pair of spacers 21 and 22 to be fixed thereto, respectively, and the rear yoke 65 is provided with a Y-axis direction plate portion 67, upper and lower portions of which are fitted in the pair of rear mounting recesses 27 and 28 of the pair of spacers 21 and 22 to be fixed thereto, respectively. The camera shake correction apparatus 15 is provided, on a rear surface of an X-axis direction plate portion 61 of the front yoke 60 that faces an X-axis direction plate portion 66 of the rear yoke 65, with a first plate magnet (permanent magnet) 63 which is fixed to the rear surface of the X-axis direction plate portion 61. The camera shake correction apparatus 15 is further provided, on a rear surface of a Y-axis direction plate portion 62 of the front yoke 60 that faces a Y-axis direction plate portion 67 of the rear yoke 65, with a second plate magnet (permanent magnet) 64 which is fixed to the rear surface of the Y-axis direction plate portion 62. The first plate magnet 63 includes an N-pole and an S-pole which are aligned in the Y-axis direction, and the second plate magnet 64 includes an N-pole and an S-pole which are aligned in the X-axis direction. As shown in FIG. 11, the X-axis direction planar drive coil CX is always positioned within the magnetic field of the second plate magnet 64, in which the linear right sides CX1 of the X-axis direction planar drive coil CX are opposed to the N-pole of the second plate magnet 64 at all times in a Z-direction orthogonal to both the X-axis and Y-axis directions (the direction of the double-headed arrow X shown in FIG. 3), i.e., in a forward/rearward direction of the camera shake correction apparatus 15, and the linear left sides CX2 of the X-axis direction planar drive coil CX are opposed to the S-pole of the second plate magnet 64 at all times in the Z-direction. As shown in FIG. 12, the Y-axis direction planar drive coil CY is always positioned within the magnetic field of the second plate magnet 63, in which the linear upper sides CY3 of the Y-axis direction planar drive coil CY are opposed to the N-pole of the first plate magnet 63 at all times in the Z-direction, and the linear lower sides CY4 of the Y-axis direction planar drive coil CY are opposed to the S-pole of the first plate magnet 63 at all times in the Z-direction.

The X-axis direction Hall element 54 is adopted to detect variations in magnetic flux in the vicinity of the border between the N-pole and the S-pole of the second plate magnet 64 to obtain information on the position of the coil substrate 50 in the X-axis direction, and the Y-axis direction Hall element 55 is adopted to detect variations in magnetic flux in the vicinity of the border between the N-pole and the S-pole of the first plate magnet 63 to obtain information on the position of the coil substrate 50 in the Y-axis direction. The X-axis direction plate portion 61 of the front yoke 60 and the X-axis direction plate portion 66 of the rear yoke 65 are positioned above the upper X-axis direction leaf spring 30 of the rectangular mounting frame 20 to be elongated in the X-axis direction and to face each other in the Z-direction with the top projection 52 of the coil substrate 50 being positioned between the X-axis direction plate portion 61 and the X-axis direction plate portion 66, and a Y-axis direction magnetic circuit (magnetic lines of force) is formed between the X-axis direction plate portion 66 and a combination of the X-axis direction plate portion 61 and the first plate magnet 63. Left ends of the X-axis direction plate portion 61 and the X-axis direction plate portion 66 are connected to each other by a connector piece 68 made of synthetic resin. The Y-axis direction plate portion 62 of the front yoke 60 and the Y-axis direction plate portion 67 of the rear yoke 65 are positioned so as to be elongated in the Y-axis direction and to face each other in the Z-direction, and an X-axis direction magnetic circuit (magnetic lines of force) is formed between the Y-axis direction plate portion 67 and a combination of the Y-axis direction plate portion 62 and the second plate magnet 64.

The front yoke 60, the second plate magnet 64, and the rear yoke 65 constitute an X-axis direction magnetic force generator, and the front yoke 60, the first plate magnet 63, the rear yoke 65 constitute a Y-axis direction magnetic force generator.

All the elements shown in FIGS. 2 through 12 which have been described above and the controller which is discussed hereinafter constitute the camera shake correction apparatus 15.

Operations of the camera shake correction apparatus 15 will be hereinafter discussed with reference to the block diagram shown in FIG. 13.

The camera shake correction apparatus 15 performs a shake correction operation (image stabilizing operation) so as to offset image shake caused by deflections (angular deflections) of the optical axis O of the photographing optical system which are caused by hand shake of a photographer (user). Such deflections of the optical axis O are detected as two separate components: the X-axis direction component and the Y-axis direction component by an X-axis direction angular velocity sensor (shake detection sensor) 201 and a Y-axis direction angular velocity sensor (shake detection sensor) 202, respectively, which are incorporated in the digital camera 10.

In a photographing operation carried out by the digital camera 10, light transmitted through the lenses L1 through L3 is converged onto the imaging surface 12 of the image pickup device 11 through the rectangular aperture 42 and the optical low-pass filter 45 to form an image on the imaging surface 12. If a camera shake correction switch SW (see FIG. 1) of the digital camera 10 is ON during the photographing operation, the output of the X-axis direction angular velocity sensor 201 and the output of the Y-axis direction angular velocity sensor 202 are integrated by integrating circuits (elements of the controller) 203 and 204 so as to be converted into an X-axis direction deflection amount and a Y-axis direction deflection amount of the optical axis O, respectively. The output (deflection amount in the X-axis direction of the digital camera 10) of the integrating circuit 203 and the output (the amount of movement of the image pickup device 11 in the X-axis direction) of the X-axis direction Hall element 54 are compared with each other in an error amplifier (an element of the controller) 205, and subsequently the error amplifier 205 applies a voltage which corresponds to an output difference between the integrating circuit 203 and the X-axis direction Hall element 54 to the X-axis direction planar drive coil CX to drive the image pickup device 11 in a manner to reduce the output difference. Similarly, the output (the deflection amount in the Y-axis direction of the digital camera 10) of the integrating circuit 204 and the output of the Y-axis direction Hall element 55 (the amount of movement of the image pickup device 11 in the Y-axis direction) are compared with each other in an error amplifier (an element of the controller) 206, and subsequently the error amplifier 206 applies a voltage which corresponds to an output difference between the integrating circuit 204 and the Y-axis direction Hall element 55 to the Y-axis direction planar drive coil CY to drive the image pickup device 11 in a manner to reduce the output difference. Namely, the image pickup device 11 is driven in the X-axis and Y-axis directions in response to deflections (deflection amount) of the optical axis O to correct image shake on the image pickup device 11 (i.e., to stabilize an object image formed on the imaging surface 12) which is caused by hand shake.

The image pickup device 11 is driven in the X-axis and Y-axis directions in the following manner.

Figure 14:
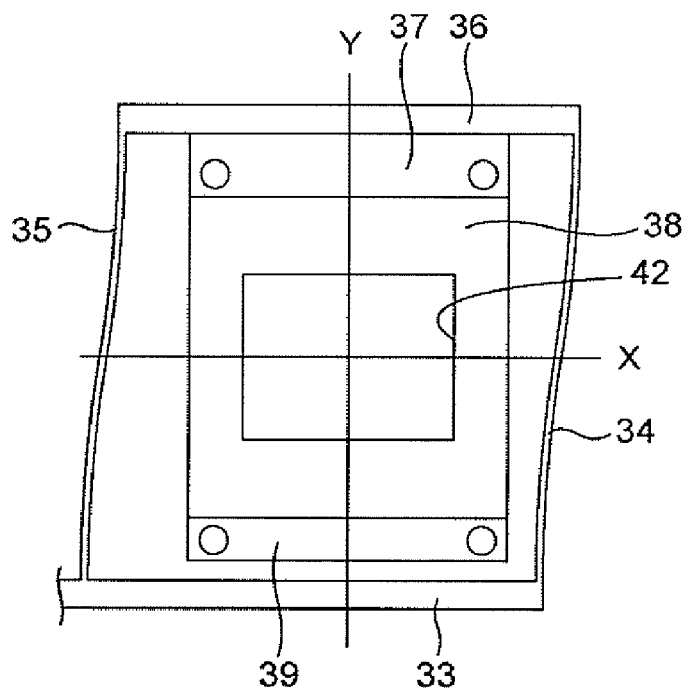
FIG. 14 is a front elevational view of an X-axis direction deformable body, showing an operative state (resiliently deformed state) thereof.

If the error amplifier 205 supplies an electric current only to the X-axis direction planar drive coil CX in a specific direction (counterclockwise direction) shown by arrows in FIG. 11, a rightward linear force FX1 (see FIG. 11) in the X-axis direction is produced in the linear right sides CX1 and the linear left sides CX2 due to the magnetic force produced by the X-axis direction magnetic circuit provided between the Y-axis direction plate portion 67 and a combination of the Y-axis direction plate portion 62 and the second plate magnet 64. Note that forces are produced also in the linear upper sides CX3 and the linear lower sides CX4 at this time; however, these forces cancel each other out. Thereupon, each of the pair of Y-axis direction leaf springs 34 and 35 is resiliently deformed in the shape of a letter S as viewed in the Z-direction so that the connecting member 36 substantially linearly moves rightward in the X-axis direction relative to the support member 33 within a range of movement in which the connecting member 36 does not come in contact with either the stationary support side-member 29 or the movable support side-member 32, and accordingly, the coil substrate 50 and the image pickup device 11 substantially linearly move rightward. For reference purposes, FIG. 14 shows an operative state (resiliently deformed state) of the X-axis direction deformable body XU in which each of the pair of Y-axis direction leaf springs 34 and 35 is resiliently deformed in the shape of a letter S (the amount of deformation of each Y-axis direction leaf spring 34 and 35 is exaggerated in FIG. 14 for the purpose of illustration). On the other hand, if the error amplifier 205 supplies an electric current only to the X-axis direction planar drive coil CX in the direction (clockwise direction) opposite to the direction shown by arrows shown in FIG. 11, a leftward linear force FX2 (see FIG. 11) in the X-axis direction is produced in the linear right sides CX1 and the linear left sides CX2 due to the magnetic force produced by the X-axis direction magnetic circuit. Note that forces are produced also in the linear upper sides CX3 and the linear lower sides CX4 at this time; however, these forces cancel each other out. Thereupon, each of the pair of Y-axis direction leaf springs 34 and 35 is resiliently deformed in the shape of a letter S as viewed in the Z-direction so that the connecting member 36 substantially linearly moves leftward in the X-axis direction relative to the support member 33 within a range of movement in which the connecting member 36 does not come in contact with either the stationary support side-member 29 or the movable support side-member 32, and accordingly, the coil substrate 50 and the image pickup device 11 substantially linearly move leftward.

Figure 13:
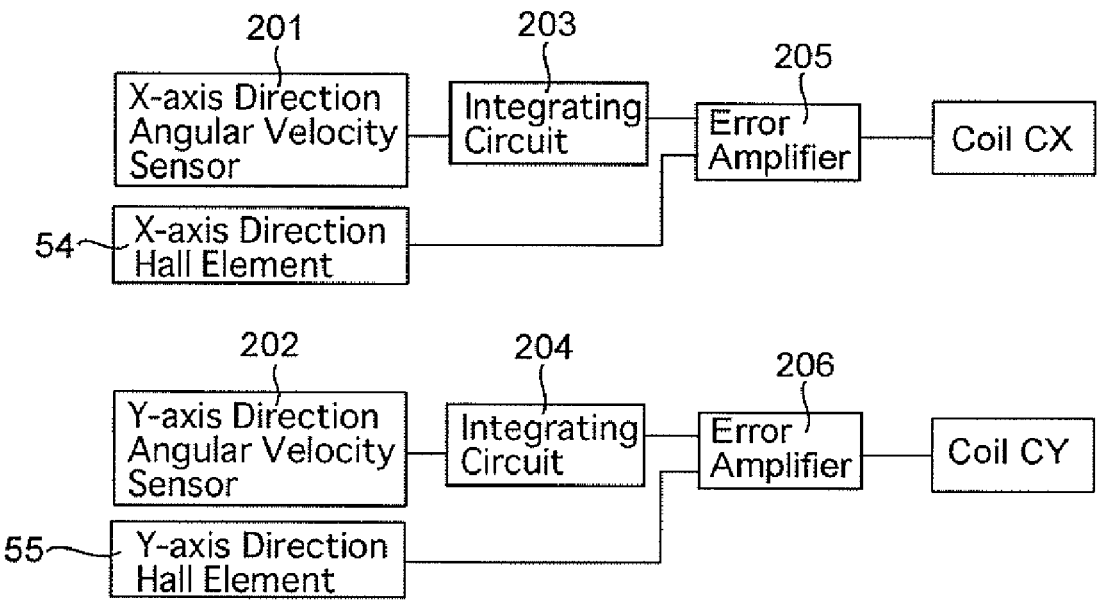
FIG. 13 is a block diagram of a control circuit.

Although the connecting member 36 moves in the X-axis direction not exactly linearly but substantially linearly with a slight displacement in the Y-axis direction when the error amplifier 205 supplies an electric current only to the X-axis direction planar drive coil CX as described above, image shake is properly corrected in practice because such a displacement in the Y-axis direction is detected by a control circuit (controller) shown in FIG. 13 using the Y-axis direction Hall element 55 so that the Y-axis direction planar drive coil CY is also supplied with an electric current to offset such a displacement in the Y-axis direction.

Similar to the case when the error amplifier 205 supplies an electric current only to the X-axis direction planar drive coil CX, if the error amplifier 206 supplies an electric current only to the Y-axis direction planar drive coil CY in a specific direction (counterclockwise direction) shown by arrows in FIG. 12, an upward linear force FY1 (see FIG. 12) in the Y-axis direction is produced in the linear upper sides CY3 and the linear lower sides CY4 due to the magnetic force produced by the Y-axis direction magnetic circuit provided between the X-axis direction plate portion 66 and a combination of the X-axis direction plate portion 61 and the first plate magnet 63. Note that forces are produced also in the linear right sides CY1 and the linear left sides CY2 at this time; however, these forces cancel each other out. Thereupon, each of the pair of X-axis direction leaf springs 30 and 31 is resiliently deformed in the shape of a letter S as viewed along the Z-direction so that the movable support side-member 32 substantially linearly moves upward in the Y-axis direction relative to the stationary support side-member 29 within a range of movement in which the movable support side-member 32 does not come in contact with the camera body, and accordingly, the coil substrate 50 and the image pickup device 11 substantially linearly move upward. On the other hand, if the error amplifier 206 supplies an electric current only to the Y-axis direction planar drive coil CY in the direction (clockwise direction) opposite to the direction shown by arrows shown in FIG. 12, a downward linear force FY2 (see FIG. 12) in the Y-axis direction is produced in the linear upper sides CY3 and the lower left sides CY4 due to the magnetic force produced by the Y-axis direction magnetic circuit. Note that forces are produced also in the linear right sides CY1 and the linear left sides CY2 at this time; however, these forces cancel each other out. Thereupon, each of the pair of X-axis direction leaf springs 30 and 31 is resiliently deformed in the shape of a letter S as viewed along the Z-direction so that the movable support side-member 32 substantially linearly moves downward in the Y-axis direction relative to the stationary support side-member 29 within a range of movement in which the movable support side-member 32 does not come in contact with the camera body, and accordingly, the coil substrate 50 and the image pickup device 11 substantially linearly move downward.

Although the movable support side-member 32 moves in the Y-axis direction not exactly linearly but substantially linearly with a slight displacement in the X-axis direction when the error amplifier 206 supplies an electric current only to the Y-axis direction planar drive coil CY as described above, image shake is properly corrected in practice because such a displacement in the X-axis direction is detected by the control circuit (controller) shown in FIG. 13 using the X-axis direction Hall element 54 so that the X-axis direction planar drive coil CX is also supplied with an electric current to offset such a displacement in the X-axis direction.

Accordingly, image shake caused by hand shake is corrected by variations in position of the image pickup device 11 in the X-axis and Y-axis directions in accordance with movements of the coil substrate 50 in the X-axis and Y-axis directions.

In the above described embodiment of the camera shake correction apparatus 15, since the X-axis direction planar drive coil CX, the Y-axis direction planar drive coil CY, the X-axis direction Hall element 54 and the Y-axis direction Hall element 55 are all fixedly fitted within the X-axis-coil cutout portion 58, the Y-axis-coil cutout portion 56, the X-axis-sensor cutout portion 59 and the Y-axis-sensor cutout portion 57 of the coil substrate 50, respectively, the maximum thickness at the portions where a portion thereof which includes the coil substrate 50, the X-axis direction planar drive coil CX, the Y-axis direction planar drive coil CY, the X-axis direction Hall element 54 and the Y-axis direction Hall element 55 are provided haves been successfully been made smaller in thickness in the forward/rearward direction than a corresponding portions of a coil substrate (which corresponds to the coil substrate 50) of a conventional camera shake correction apparatus in which an X-axis direction planar drive coil, a Y-axis direction planar drive coil, an X-axis direction Hall element and a Y-axis direction Hall element (which correspond to the X-axis direction planar drive coil CX, the Y-axis direction planar drive coil CY, the X-axis direction Hall element 54 and the Y-axis direction Hall element 55, respectively) are fixed to the front of a the coil substrate (which corresponds to the coil substrate 50) since all the X-axis direction planar drive coil CX, the Y-axis direction planar drive coil CY, the X-axis direction Hall element 54 and the Y-axis direction Hall element 55 are fixedly fitted in the made-for-X-axis-direction-coil cutout portion 58, the made-for-Y-axis-direction-coil cutout portion 56, the made-for-X-axis-direction-sensor cutout portion 59 and the made-for-Y-axis-direction-sensor cutout portion 57 of the coil substrate 50, respectively, in the above described embodiment of the camera shake correction apparatus 15. This structure makes it possible to make the thickness of the camera body of the digital camera 10 in the forward/rearward direction smaller than beforethat prior art.

Moreover, the magnetic force produced by the X-axis direction magnetic circuit, that is provided between the Y-axis direction plate portion 67 and a combination of the Y-axis direction plate portion 62 and the second plate magnet 64, easily acts on the X-axis direction planar drive coil CX and the X-axis direction Hall element 54 while the magnetic force produced by the Y-axis direction magnetic circuit, that is provided between the X-axis direction plate portion 66 and a combination of the X-axis direction plate portion 61 and the first plate magnet 63, easily acts on the Y-axis direction planar drive coil CY and the Y-axis direction Hall element 55 as compared with the case where an X-axis direction planar drive coil, a Y-axis direction planar drive coil, an X-axis direction Hall element and a Y-axis direction Hall element (which correspond to the X-axis direction planar drive coil CX, the Y-axis direction planar drive coil CY, the X-axis direction Hall element 54 and the Y-axis direction Hall element 55, respectively) are fixed to the front of a coil substrate (which corresponds to the coil substrate 50). Therefore, even if the front yoke 60, the rear yoke 65, the first plate magnet 63 and the second plate magnet 64 are made smaller and thinner than the prior art, the image pickup device 11 can be driven in the X-axis and Y-axis directions in the same manner as that of the prior art.

Additionally, the X-axis direction Hall element 54 and the Y-axis direction Hall element 55 can detect the position of the coil substrate 50 in the X-axis and Y-axis directions with the same degree of precision as in the prior art. Note that the magnetic force produced by the X-axis direction magnetic circuit becomes easier to act on the X-axis direction planar drive coil CX (i.e., becomes more resistant to leakage flux) as the distance between the second plate magnet 64 and the rear yoke 65 in the forward/rearward direction is shortened and that the magnetic force produced by the Y-axis direction magnetic circuit becomes easier to act on the Y-axis direction planar drive coil CY (i.e., becomes more resistant to leakage flux) as the distance between the first plate magnet 63 and the rear yoke 65 in the forward/rearward direction is shortened, which enhances the above-described effect of the present invention.

Although the present invention has been discussed above with reference to the specific embodiment described above, the present invention is not limited solely thereto; various changes can be made in this specific embodiment.

For instance, it is possible for the front ends of the X-axis direction planar drive coil CX and the X-axis direction Hall element 54 to project forward from the front of the X-direction-sensor cutout portion 59, or for the rear ends of the X-axis direction planar drive coil CX and the X-axis direction Hall element 54 to project rearward from the rear of the X-direction-sensor cutout portion 59. Similarly, it is possible for the front ends of the Y-axis direction planar drive coil CY and the Y-axis direction Hall element 55 to project forward from the front of the Y-direction-sensor cutout portion 57, or for the rear ends of the Y-axis direction planar drive coil CY and the Y-axis direction Hall element 55 to projection rearward from the rear of the Y-direction-sensor cutout portion 57. Even in such a structure, it is still possible to achieve a reduction in length (thickness) of the camera shake correction apparatus (and thus the camera body of the camera using the camera shake correction apparatus) in the forward/rearward direction, compared to a conventional camera shake correction apparatus.

Additionally, it is possible for each of the Y-direction-coil cutout portion 56, the Y-direction-sensor cutout portion 57, the X-direction-coil cutout portion 58 and the X-direction-sensor cutout portion 59 be formed in the coil substrate 50 as either a through-hole (rather than a cutout portion), the front and rear ends of which being open on front and rear surfaces of the coil substrate 50 in the forward/rearward direction, respectively, or a bottomed hole having a closed end and an open end at one and the other of the front and rear surfaces of the coil substrate 50 in the forward/rearward direction, respectively.

Figure 15:
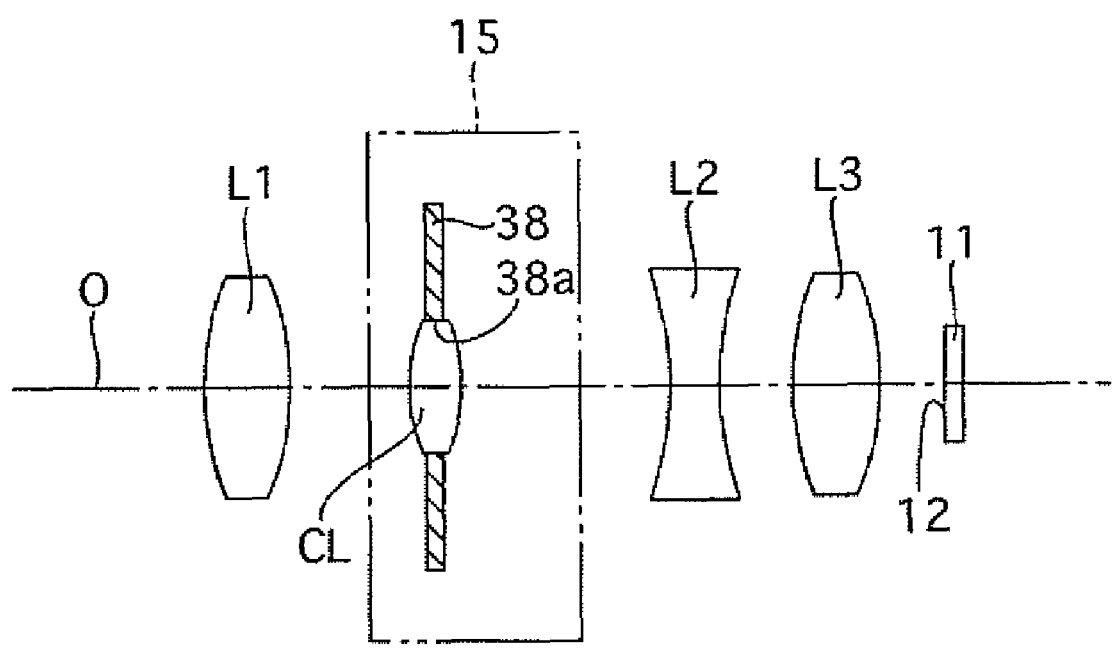
FIG. 15 is an axial cross sectional view of a portion of a modified embodiment of the camera shake correction apparatus according to the present invention, wherein a correction lens is provided.

Although the image pickup device 11 is secured to the support enclosure 38 which is moved in the X-axis and Y-axis directions to compensate image shake in each of the above illustrated embodiment of the camera shake correction apparatus, it is possible to arrange the camera shake correction apparatus 15, for example as shown in FIG. 15, between the lenses L1 and L2 (or alternatively between the lenses L2 and L3), to arrange the image pickup device 11 behind the camera shake correction apparatus 15 and to form a circular mounting hole 38*a* in the support enclosure 38 in which a correction lens CL can be fixedly fitted so that the optical axis of the correction lens CL coincides with the optical axis O of the photographing optical system. In this modification, the correction lens CL is linearly moved in the X-axis and Y-axis directions to compensate camera shake. Furthermore, the camera shake correction apparatus 15 using the correction lens CL can be applied to a silver-halide film camera which does not use an image pickup device.

Although the X-axis direction Hall element 54 and the Y-axis direction Hall element 55 are used as position sensors in the above described embodiment of the camera shake correction apparatus, each of the X-axis direction Hall element 54 and the Y-axis direction Hall element 55 can be replaced by an MR (magnetic resonance) sensor or an optical position sensor.

Although the stage apparatus according to the present invention is applied to the camera shake correction apparatus 15 in the above description, the stage apparatus according to the present invention is not limited solely to such a particular usage.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stage apparatus comprising:
   a stationary support member;
   a movable stage plate supported by said stationary support member to be movable in a plane relative to said stationary support member;

at least one magnetic force generator which is provided integral with said stationary support member; and at least one coil which is mounted on said movable stage plate and receives a magnetic force generated by said magnetic force generator to produce a driving force for driving said movable stage plate in said plane, wherein at least one hole in which said coil is fixedly fitted is formed on said movable stage plate.

2. The stage apparatus according to claim 1, wherein said hole comprises a through-hole.

3. The stage apparatus according to claim 1, wherein a thickness of said coil is smaller than a depth of said hole so that said coil is positioned within said hole.

4. The stage apparatus according to claim 1, wherein two of said coil respectively comprise an X-axis direction drive coil for generating a driving force in a specific X-axis direction in said plane, and a Y-axis direction drive coil for generating a driving force in a Y-axis direction, which is perpendicular to said X-axis direction, in said plane, wherein two of said hole respectively comprise an X-direction-coil hole in which said X-axis direction drive coil is fixedly fitted, and a Y-direction-coil hole in which said Y-axis direction drive coil is fixedly fitted.

5. The stage apparatus according to claim 4, further comprising:

a Y-axis direction deformable body including a stationary support member, a movable support member and a pair of X-axis direction leaf springs to form a substantially rectangular shape in a free state; and an X-axis direction deformable body, positioned in said Y-axis direction deformable body, including a connecting member, a support member and a pair of Y-axis direction leaf springs to form a substantially rectangular shape in a free state, wherein said stationary support member and said movable support member of said Y-axis direction deformable body and said pair of Y-axis direction leaf springs of said X-axis direction deformable body extend in said Y-axis direction, wherein said pair of X-axis direction leaf springs of said Y-axis direction deformable body and said connecting member and said support member of said X-axis direction deformable body extend in said X-axis direction, and wherein said support member of said X-axis direction deformable body includes a support member joint portion which joins said support member to said movable support member of said Y-axis direction deformable body.

6. The stage apparatus according to claim 1, wherein said magnetic force generator comprises:

at least one yoke which is made of a magnetic material and provided integral with said stationary support member; and at least one magnet for producing magnetic lines of force between said magnet and said yoke.

7. The stage apparatus according to claim 1, wherein at least one sensor hole is formed on said movable stage plate, a position sensor being fixedly fitted in said sensor hole.

8. The stage apparatus according to claim 7, wherein said position sensor comprises a Hall element that detects variations in magnetic flux generated by said magnetic force generator.

9. The stage apparatus according to claim 7, wherein a thickness of said position sensor is smaller than a depth of said sensor hole so that said position sensor is accommodated within said sensor hole.

10. The stage apparatus according to claim 7, wherein two of said position sensor respectively comprise an X-axis direction position sensor for detecting a position of said movable stage plate in a specific X-axis direction in said plane, and a Y-axis direction position sensor for detecting a position of said movable stage plate in a Y-axis direction, which is perpendicular to said X-axis direction, in said plane, wherein two of said sensor hole respectively comprise a X-direction-sensor hole in which said X-axis direction position sensor is fixedly fitted, and a Y-direction-sensor hole in which said Y-axis direction position sensor is fixedly fitted.

11. The stage apparatus according to claim 1, wherein said coil is formed as a flat coil lying in said plane.

12. The stage apparatus according to claim 11, wherein said coil is substantially rectangularly coiled.

13. The stage apparatus according to claim 1, wherein said coil is substantially identical to said hole with respect to outer shape and size thereof so as to be snugly fitted therein.

14. The stage apparatus according to claim 1, wherein said movable stage plate comprises at least one projection which substantially lies in said plane, said hole being formed on said projection.

15. The stage apparatus according to claim 7, wherein said hole and said sensor hole are communicatively connected to each other.

16. The stage apparatus according to claim 1, wherein said stage apparatus is incorporated in a camera.

17. The stage apparatus according to claim 16, wherein an image pickup device is mounted on said movable stage plate.

18. A camera shake correction apparatus having a stage apparatus comprising:

a stationary support member;

a movable stage plate supported by said stationary support member to be movable in a plane relative to said stationary support member;

an X-axis direction magnetic force generator and a Y-axis direction magnetic force generator which are provided integral with said stationary support member;

an X-axis direction drive coil for generating a driving force in a specific X-axis direction in said plane and receives a magnetic force generated by said X-axis direction magnetic force generator to produce a driving force for driving said movable stage plate in said X-axis direction in said plane;

a Y-axis direction drive coil for generating a driving force in a Y-axis direction, which is perpendicular to said X-axis direction, in said plane and receives a magnetic force generated by said Y-axis direction magnetic force generator to produce a driving force for driving said movable stage plate in said Y-axis direction in said plane;

an X-direction-coil hole in which said X-axis direction drive coil is fixedly fitted;

a Y-direction-coil hole in which said Y-axis direction drive coil is fixedly fitted;

an X-direction-sensor hole formed on said movable stage plate having an X-axis direction position sensor fixedly fitted therein for detecting a position of said movable stage plate in said X-axis direction in said plane;

a Y-direction-sensor hole formed on said movable stage plate having a Y-axis direction position sensor fixedly fitted therein for detecting a position of said movable stage plate in and Y-axis direction in said plane;

wherein said camera shake correction apparatus comprises:

a camera which incorporates said stage apparatus;

an image pickup device positioned behind a photographing optical system of said camera, having an imaging surface located on an image plane of said photographing optical system, said image pick device being movable together with said movable stage plate;

a camera shake detection sensor which detects camera shake of said camera; and a controller which applies a voltage to at least one of said X-axis direction drive coil and said Y-axis direction drive coil to reduce a difference between the amount of said camera shake detected by said camera shake detection sensor and the amount of movement of said movable stage plate which is detected using said X-axis direction position sensor and said Y-axis direction position sensor.

19. A camera shake correction apparatus having a stage apparatus comprising:

a stationary support member;

a movable stage plate supported by said stationary support member to be movable in a plane relative to said stationary support member;

an X-axis direction magnetic force generator and a Y-axis direction magnetic force generator which are provided integral with said stationary support member;

an X-axis direction drive coil for generating a driving force in a specific X-axis direction in said plane and receives a magnetic force generated by said X-axis direction magnetic force generator to produce a driving force for driving said movable stage plate in said X-axis direction in said plane;

a Y-axis direction drive coil for generating a driving force in a Y-axis direction, which is perpendicular to said X-axis direction, in said plane and receives a magnetic force generated by said Y-axis direction magnetic force generator to produce a driving force for driving said movable stage plate in said Y-axis direction in said plane;

an X-direction-coil hole in which said X-axis direction drive coil is fixedly fitted;

a Y-direction-coil hole in which said Y-axis direction drive coil is fixedly fitted;

an X-direction-sensor hole formed on said movable stage plate having an X-axis direction position sensor fixedly fitted therein for detecting a position of said movable stage plate in said X-axis direction in said plane;

a Y-direction-sensor hole formed on said movable stage plate having a Y-axis direction position sensor fixedly fitted therein for detecting a position of said movable stage plate in and Y-axis direction in said plane;

wherein said camera shake correction apparatus comprises:

a camera which incorporates said stage apparatus;

a correction lens located in front of an image plane of a photographing optical system of said camera, positioned so that an optical axis of said correction lens coincides with an optical axis of said photographing optical system, and being movable together with said movable stage plate;

a camera shake detection sensor which detects camera shake of said camera; and a controller which applies a voltage to at least one of said X-axis direction drive coil and said Y-axis direction drive coil to reduce a difference between the amount of said camera shake detected by said camera shake detection sensor and the amount of movement of said movable stage plate which is detected using said X-axis direction position sensor and said Y-axis direction position sensor.

* * * * *